(12) United States Patent
Bando

(10) Patent No.: US 10,800,697 B2
(45) Date of Patent: Oct. 13, 2020

(54) GLASS-PLATE WORKING APPARATUS

(71) Applicant: BANDO KIKO CO., LTD., Tokushima-shi, Tokushima (JP)

(72) Inventor: Kazuaki Bando, Tokushima (JP)

(73) Assignee: BANDO KIKO CO., LTD., Tokushima-shi, Tokushima (JP)

( * ) Notice: Subject to any disclaimer, the term of this patent is extended or adjusted under 35 U.S.C. 154(b) by 229 days.

(21) Appl. No.: 15/749,531

(22) PCT Filed: Aug. 24, 2016

(86) PCT No.: PCT/JP2016/003864
§ 371 (c)(1),
(2) Date: Feb. 1, 2018

(87) PCT Pub. No.: WO2017/033462
PCT Pub. Date: Mar. 2, 2017

(65) Prior Publication Data
US 2018/0222785 A1 Aug. 9, 2018

(30) Foreign Application Priority Data
Aug. 25, 2015 (JP) .................................. 2015-166267

(51) Int. Cl.
*B24B 9/10* (2006.01)
*C03B 33/03* (2006.01)
(Continued)

(52) U.S. Cl.
CPC .............. *C03B 33/03* (2013.01); *B24B 7/241* (2013.01); *B24B 7/245* (2013.01); *B24B 9/10* (2013.01);
(Continued)

(58) Field of Classification Search
CPC ........... B24B 7/241; B24B 7/245; B24B 9/10; B24B 41/068; B24B 47/22
(Continued)

(56) References Cited

U.S. PATENT DOCUMENTS 3,813,826 A * 6/1974 Bando .................... B24B 9/105
451/342
5,143,196 A * 9/1992 Henn ..................... B24B 9/102
198/345.3
(Continued)

FOREIGN PATENT DOCUMENTS

| CN | 1146759 A | 4/1997 |
| CN | 1294566 A | 5/2001 |

(Continued)

OTHER PUBLICATIONS

International Search Report of PCT/JP2016/003864, dated Oct. 11, 2016, 4 pages.
(Continued)

*Primary Examiner* — George B Nguyen
(74) *Attorney, Agent, or Firm* — Nixon & Vanderhye P.C.

(57) ABSTRACT

A glass-plate working apparatus 1 includes: a scribe line forming device 5, glass-plate bend-breaking devices 15A and 15B, glass-plate peripheral edge grinding devices 19A and 19B, and a glass-plate transporting device 20 for carrying in and carrying out two glass plates 2 at a time with respect to each of the scribe line forming device 5, the glass-plate bend-breaking devices 15A and 15B, and the glass-plate peripheral edge grinding devices 19A and 19B, and X-Y coordinate system controlled movement of the glass-plate peripheral edge grinding devices 19A and 19B in simultaneous grinding of peripheral edges of the glass plates 2 is adapted to be effected independently of each other.

2 Claims, 6 Drawing Sheets

(51) Int. Cl.
*C03B 33/037* (2006.01)
*B24B 47/22* (2006.01)
*B24B 41/06* (2012.01)
*B24B 7/24* (2006.01)
*C03B 33/027* (2006.01)

(52) U.S. Cl.
CPC ............ *B24B 41/068* (2013.01); *B24B 47/22* (2013.01); *C03B 33/027* (2013.01); *C03B 33/037* (2013.01); *B65G 2249/04* (2013.01)

(58) Field of Classification Search
USPC .......................................................... 451/44
See application file for complete search history.

(56) References Cited

U.S. PATENT DOCUMENTS

| | | | | |
|---|---|---|---|---|
| 5,325,635 | A * | 7/1994 | Ikola | B24B 9/107 451/106 |
| 5,733,353 | A * | 3/1998 | Bando | B24B 9/10 65/105 |
| 5,759,222 | A * | 6/1998 | Bando | B24B 9/102 65/174 |
| 5,810,642 | A * | 9/1998 | Bando | C03B 33/03 225/96.5 |
| 5,873,773 | A * | 2/1999 | Bando | C03B 33/027 125/23.01 |
| 6,461,223 | B1 * | 10/2002 | Bando | B24B 9/102 451/12 |
| 2010/0330888 | A1 * | 12/2010 | Bando | B24B 9/102 451/282 |
| 2011/0143639 | A1 * | 6/2011 | Bando | B65G 49/064 451/44 |
| 2014/0187126 | A1 * | 7/2014 | Nakanishi | H01L 21/02057 451/44 |

FOREIGN PATENT DOCUMENTS

| | | |
|---|---|---|
| CN | 101165858 A | 4/2008 |
| CN | 101607378 A | 12/2009 |
| CN | 204430990 U | 7/2015 |
| JP | 2-9558 | 1/1990 |
| JP | H06-504236 | 5/1994 |
| JP | H08-231238 | 9/1996 |
| JP | H08-333127 | 12/1996 |
| JP | 2001-322057 | 11/2001 |
| JP | 3817755 B2 | 6/2006 |
| JP | 2009-196851 | 9/2009 |
| RU | 2 079 455 C1 | 5/1997 |
| RU | 26 994 U1 | 1/2003 |
| RU | 2 419 530 C2 | 5/2011 |
| TW | 200930501 A | 7/2009 |
| TW | 201130601 A | 9/2011 |
| WO | WO 96/39361 A1 | 12/1996 |

OTHER PUBLICATIONS

Notice on the First Office Action dated Dec. 12, 2018 in Chinese Application No. 201680048913.8, with Summarized English Translation (10 pages).
Decision of Refusal dated Sep. 3, 2019 in Japanese Application No. 2017-146653, with English translation, 4 pages.
KIPO Notification of Reason for Refusal dated Oct. 21, 2019 in Korean Application No. 10-2018-7005136, English translation, 3 pages.
Chinese Office Action dated Jul. 26, 2019 in Chinese Application No. 201680048913.8, with English translation, 12 pages.
Extended European Search Report dated Mar. 14, 2019 in European Application No. 16838812.2, 6 pages.
Notice of Reasons for Refusal dated May 14, 2019 in Japanese Application No. 2017-146653, with English translation, 6 pages.
Chinese Office Action dated Jan. 17, 2020 in Chinese Application No. 201680048913.8, with English translation, 10 pages.

* cited by examiner

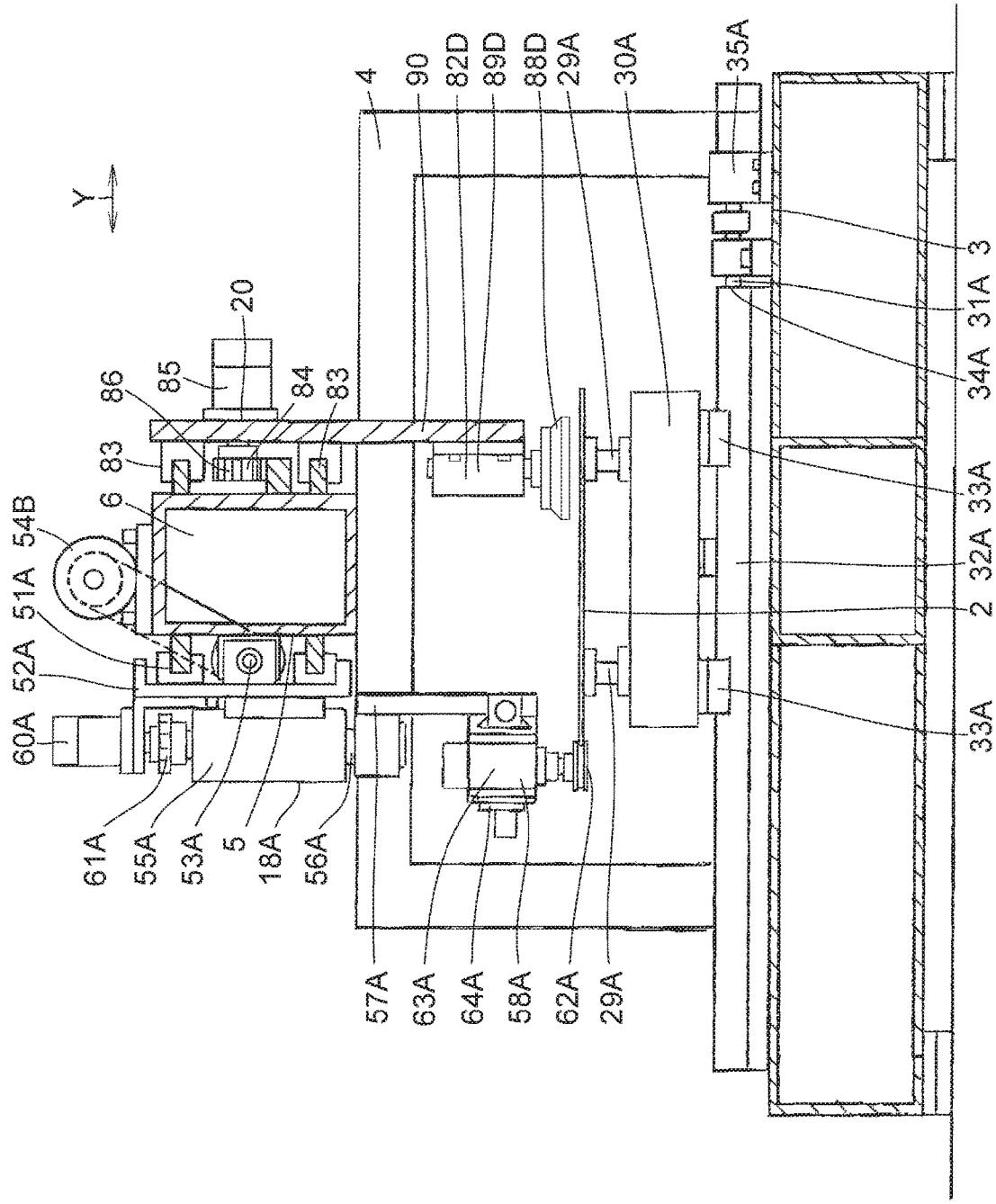

GLASS-PLATE WORKING APPARATUS

This application is the U.S. national phase of International Application No. PCT/JP2016/003864 filed Aug. 24, 2016, which designated the U.S. and claims priority to JP Patent Application No. 2015-166267 filed Aug. 25, 2015, the entire contents of each of which are hereby incorporated by reference.

TECHNICAL FIELD

The present invention relates to a glass-plate working apparatus for manufacturing glass plates for automobile windows and glass plates for other usage by performing processing including cutting (cut line forming, i.e., scribing), bend-breading, and peripheral edge grinding with respect to the glass plates.

In addition, the present invention concerns a glass-plate working apparatus in which at least two glass plates at a time are simultaneously processed in a cutting (scribing) position, a bend-breaking position, and a peripheral edge grinding position.

BACKGROUND ART

Patent Document 1 describes a glass-plate working apparatus in which two glass plates at a time are simultaneously processed in a scribing position, a bend-breaking position, and a peripheral edge grinding position while the two glass plates at a time are replaced and transported consecutively among the scribing position, the bend-breaking position, and the peripheral edge grinding position.

PRIOR ART DOCUMENT

Patent Document

Patent Document 1: JP-A-8-231238

SUMMARY OF THE INVENTION

Problems that the Invention is to Solve

The glass-plate working apparatus described in Patent Document 1 is comprised of a main cut line forming section having two main cut line forming devices and a glass plate peripheral edge grinding section having two peripheral edge grinding devices.

Further, in such a glass-plate working apparatus, respective scribe heads of the two main cut line forming devices and a glass-plate supporting scribe worktable are adapted to be concurrently moved integrally in parallel along the X-axis and the Y-axis by a common X-axis moving means and a common Y-axis moving means, and to be moved under control by a mutually identical X-Y coordinate system so as to respectively scribe corresponding ones of the two glass plates. Respective grinding heads of the two peripheral edge grinding devices and a grinding worktable are adapted to be concurrently moved integrally in parallel along the X-axis and the Y-axis, and to be moved under control by a mutually identical X-Y coordinate system so as to respectively effect the peripheral edge grinding of corresponding ones of the two glass plates. Meanwhile, the two glass plates with the scribe lines formed in the main cut line forming section are replaced and transported from the main cut line forming section onto the grinding worktable of the bend-breaking section and the peripheral edge grinding section by a glass plate transporting device, and the glass plates are subjected to peripheral edge grinding at positions on the grinding worktable and are thereby formed into final finished dimensions.

However, in such a glass-plate working apparatus, deviations can occur in the finished dimensions and shapes of the two glass plates due to positional deviation of each of the two glass plates carried into the peripheral edge grinding section, and glass plates of inferior quality can be produced.

The glass plate peripheral edge grinding section has two peripheral edge grinding devices corresponding to the respective glass plates carried in, and both grinding heads of the peripheral edge grinding devices are adapted to be integrally moved along the X-axis by the common X-axis moving means, while the worktable onto which the glass plates are sucked and fixed is adapted to be integrally moved along the Y-axis by the common Y-axis moving means. Namely, since the two peripheral edge grinding devices are respectively so arranged as to effect controlled movement of the grinding heads and the worktable by the integrated identical X-Y coordinate system, it is impossible to cope with the respective positional deviations (errors) of the two glass plates, causing deviations in the final finished dimensions and shapes and resulting in defects in the ground quality.

An object of the present invention is to provide a glass-plate working apparatus which is capable of processing two glass plates at a time without producing glass plates having inferior ground quality.

Means for Solving the Problems

A glass-plate working apparatus in accordance with the present invention comprises: a scribe line forming device for forming scribe lines on two glass plates; a glass-plate bend-breaking device for bend-breaking the two glass plates; a glass-plate peripheral edge grinding device for grinding peripheral edges of the two glass plates; and a glass-plate transporting device for carrying in and carrying out two glass plates at a time with respect to each of the scribe line forming device, the glass-plate bend-breaking device, and the glass-plate peripheral edge grinding device, wherein X-Y coordinate system controlled movement of the glass-plate peripheral edge grinding device in simultaneous grinding of peripheral edges of the two glass plates is adapted to be effected independently of each other.

In addition, a glass-plate working apparatus in accordance with the present invention comprises: a scribing position for forming scribe lines on two glass plates; a bend-breaking position for bend-breaking the two glass plates; a peripheral edge grinding position for grinding peripheral edges of corresponding ones of the glass plates by two glass-plate peripheral edge grinding devices which are moved under control by a X-Y coordinate system, and a glass-plate transporting device whereby two glass plates at a time are replaced and transported consecutively among said positions, wherein X-Y coordinate system controlled movement of the two glass-plate peripheral edge grinding devices is adapted to be effected independently of each other.

In such a glass-plate working apparatus in accordance with the present invention, preferably, in two glass-plate peripheral edge grinding devices, an X-axis moving means of a grinding head of one glass-plate peripheral edge grinding device and a Y-axis moving means of a grinding worktable, as well as an X-axis moving means of a grinding head of the other glass-plate peripheral edge grinding device and a Y-axis moving means of another grinding worktable, are provided independently of each other, and are operated under numerical control (NC) independently of each other.

Advantages of the Invention

According to the glass-plate working apparatus in accordance with the present invention, in the grinding position for grinding two glass plates, the pair of glass-plate peripheral edge grinding devices corresponding to the respective glass plates are moved under numerical control independently of each other, for the two glass plates, whereby the grinding heads and the glass plates can be moved under control in correspondence with the positions of the respective glass plates, so that the two glass plates can be subjected to grinding with accurate finished dimensions, shapes, and quality.

In addition, according to the glass-plate working apparatus in accordance with the present invention, two glass plates having mutually different sizes can be simultaneously ground, and can be ground to the respective finished dimensions and shapes.

Namely, according to the glass-plate working apparatus in accordance with the present invention, the respective glass-plate peripheral edge grinding devices can be provided with numerical control which is corrected and corresponds to the positions of the glass plates transported to the respective glass-plate peripheral edge grinding devices, and it is possible to effect grinding of glass plates having mutually different dimensions.

BRIEF DESCRIPTION OF THE DRAWINGS

FIG. 6 is a cross-sectional view taken in the direction of arrows along line VI-VI of FIG. 1.

MODE FOR CARRYING OUT THE INVENTION

Figure 1:
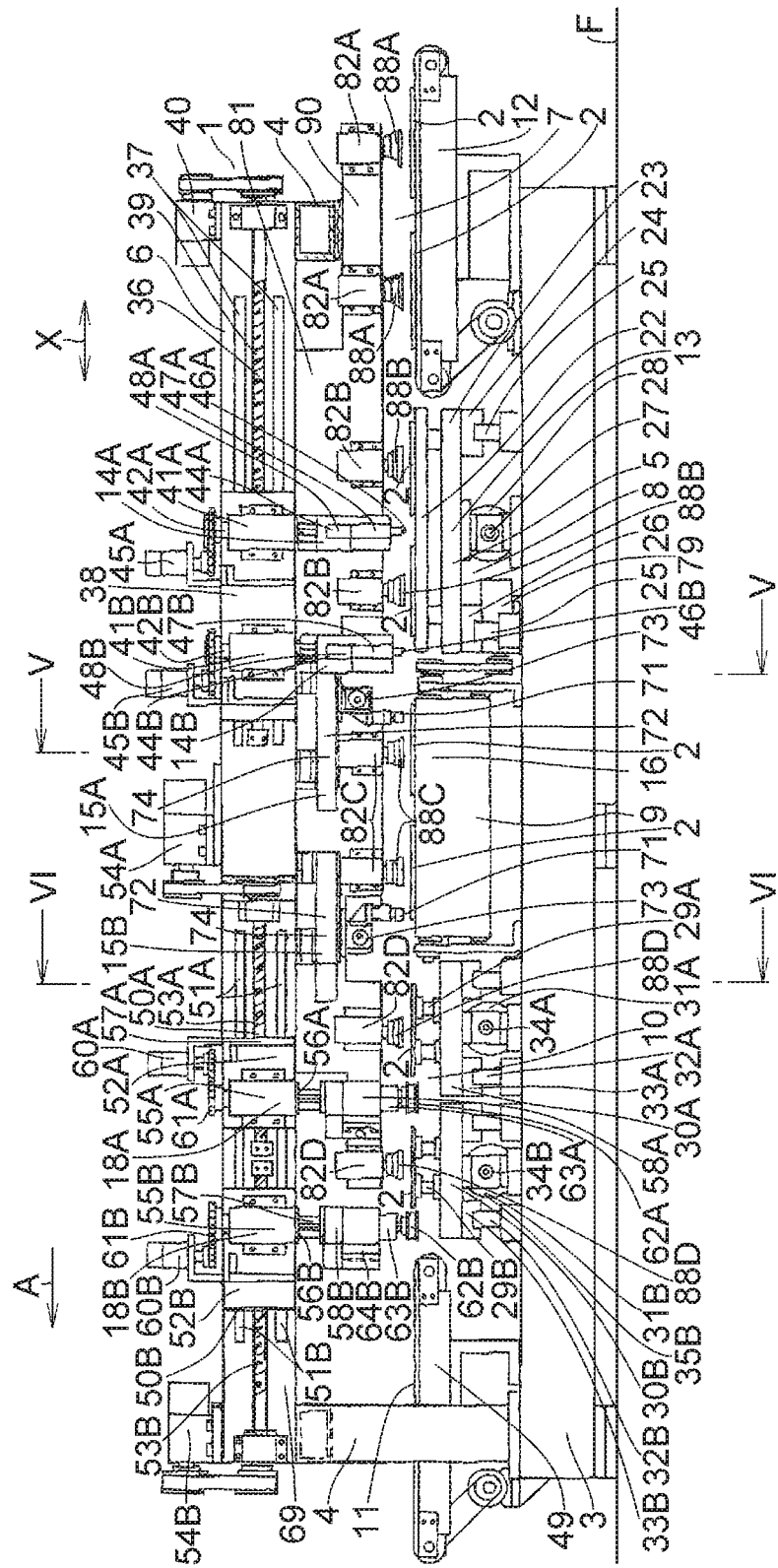
FIG. 1 is an explanatory front elevational view of an embodiment of a glass-plate working apparatus in accordance with the present invention.

Hereafter, a description will be given of a preferred mode for carrying out the invention with reference to an embodiment shown in the drawings. It should be noted that the invention is not limited to the embodiment.

Figure 2:
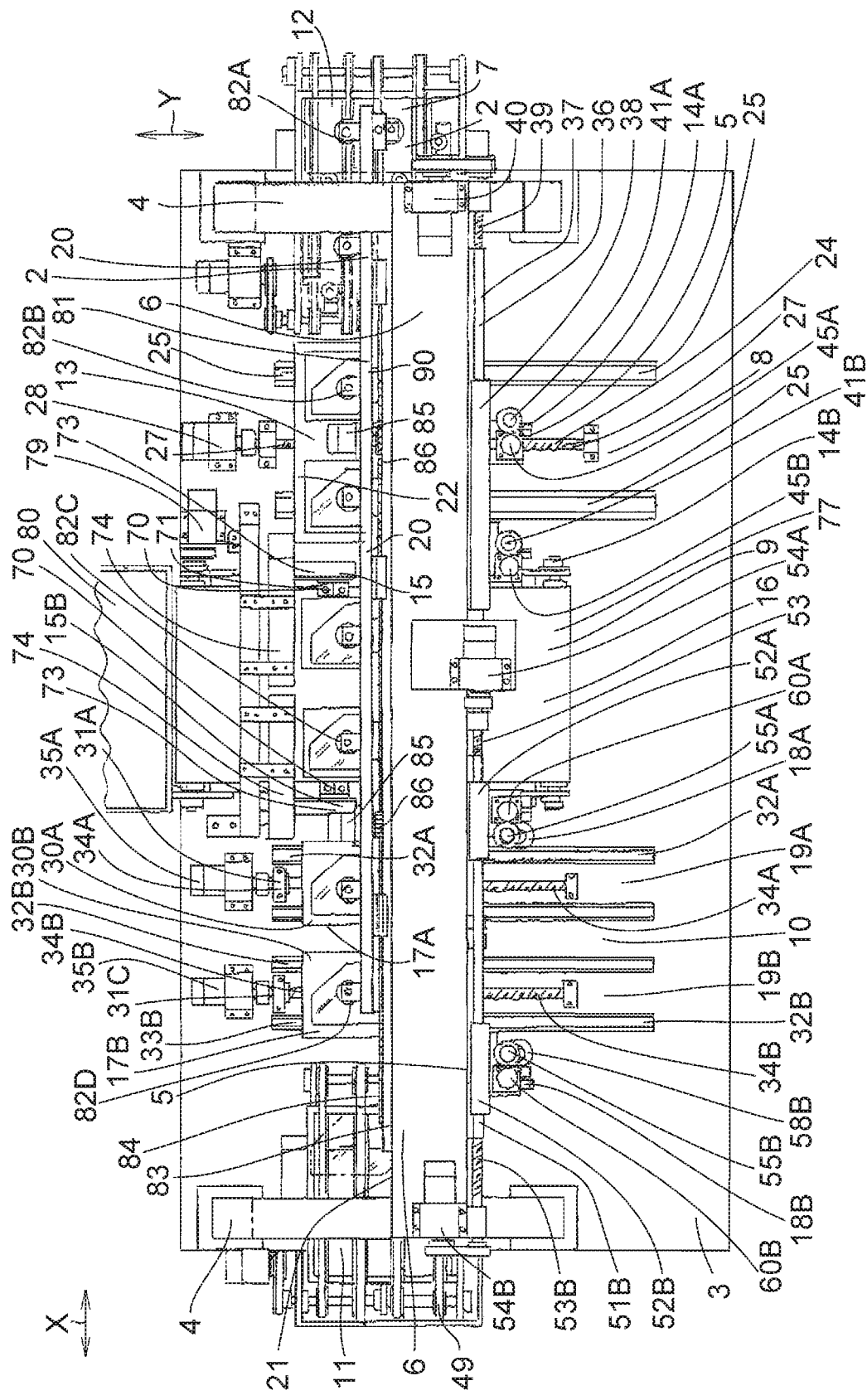
FIG. 2 is an explanatory plan view of the embodiment shown in FIG. 1.
Figure 3:
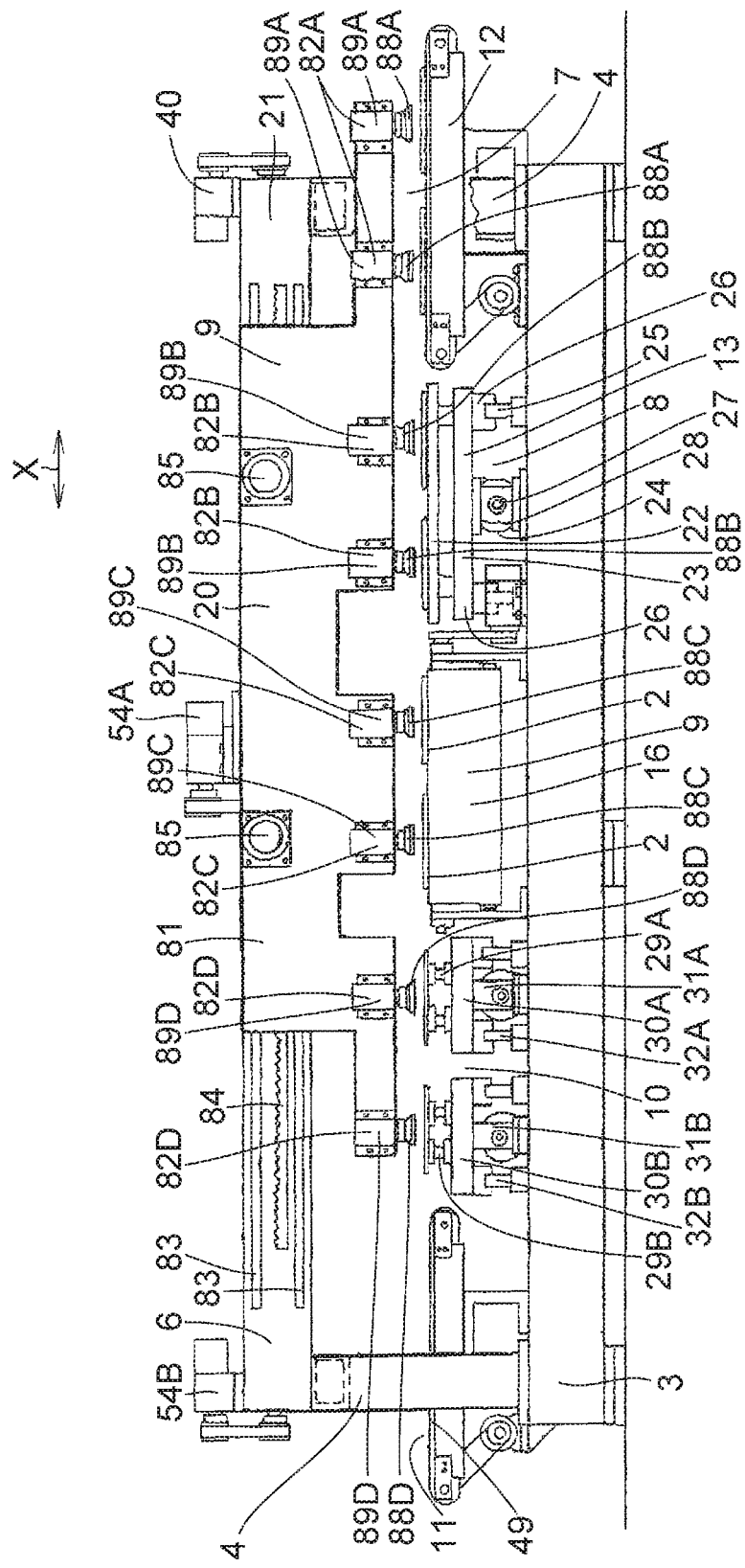
FIG. 3 is an explanatory rear view of the embodiment shown in FIG. 1.
Figure 4:
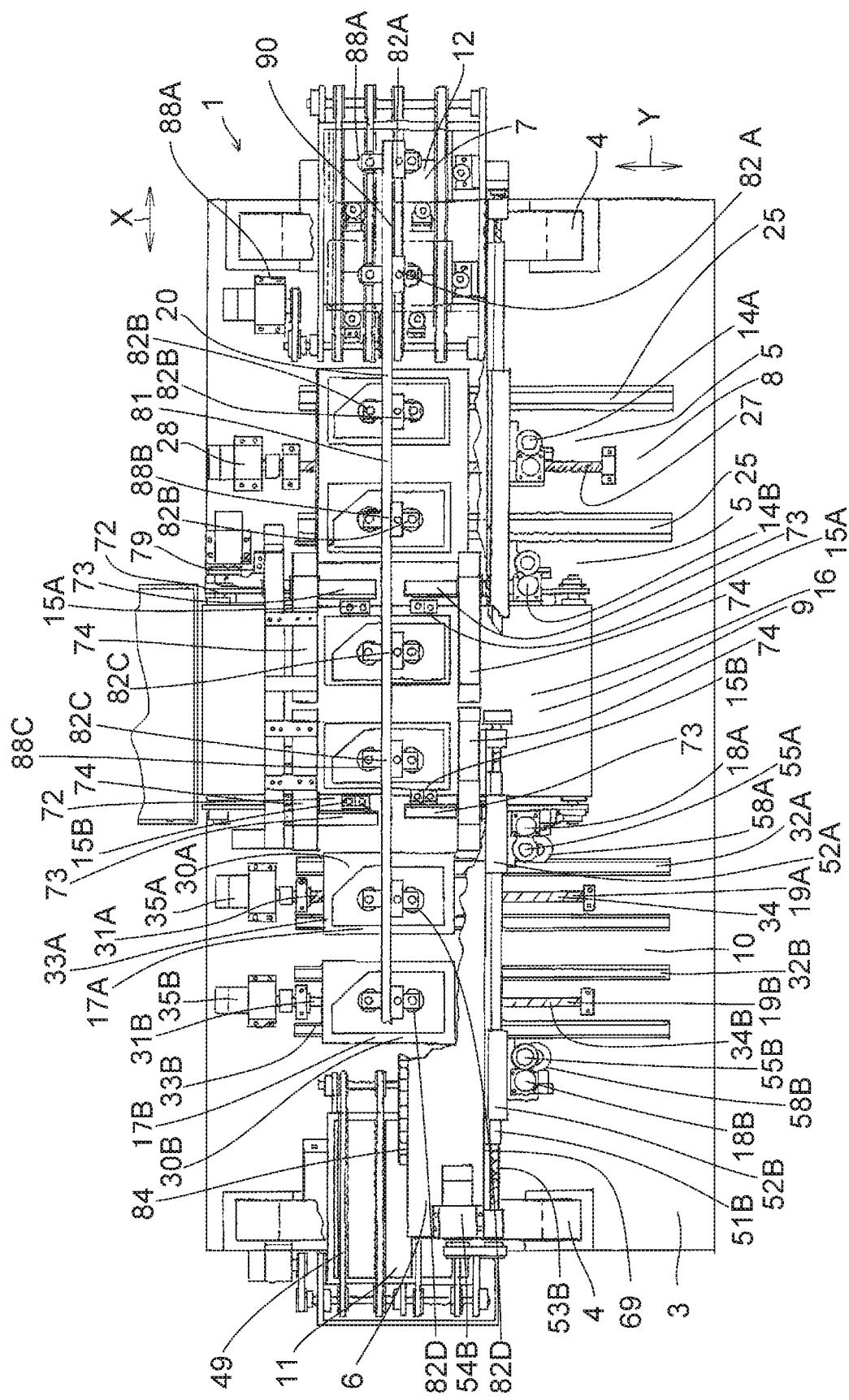
FIG. 4 is an explanatory partially cutaway plan view of the embodiment shown in FIG. 1.
Figure 5:
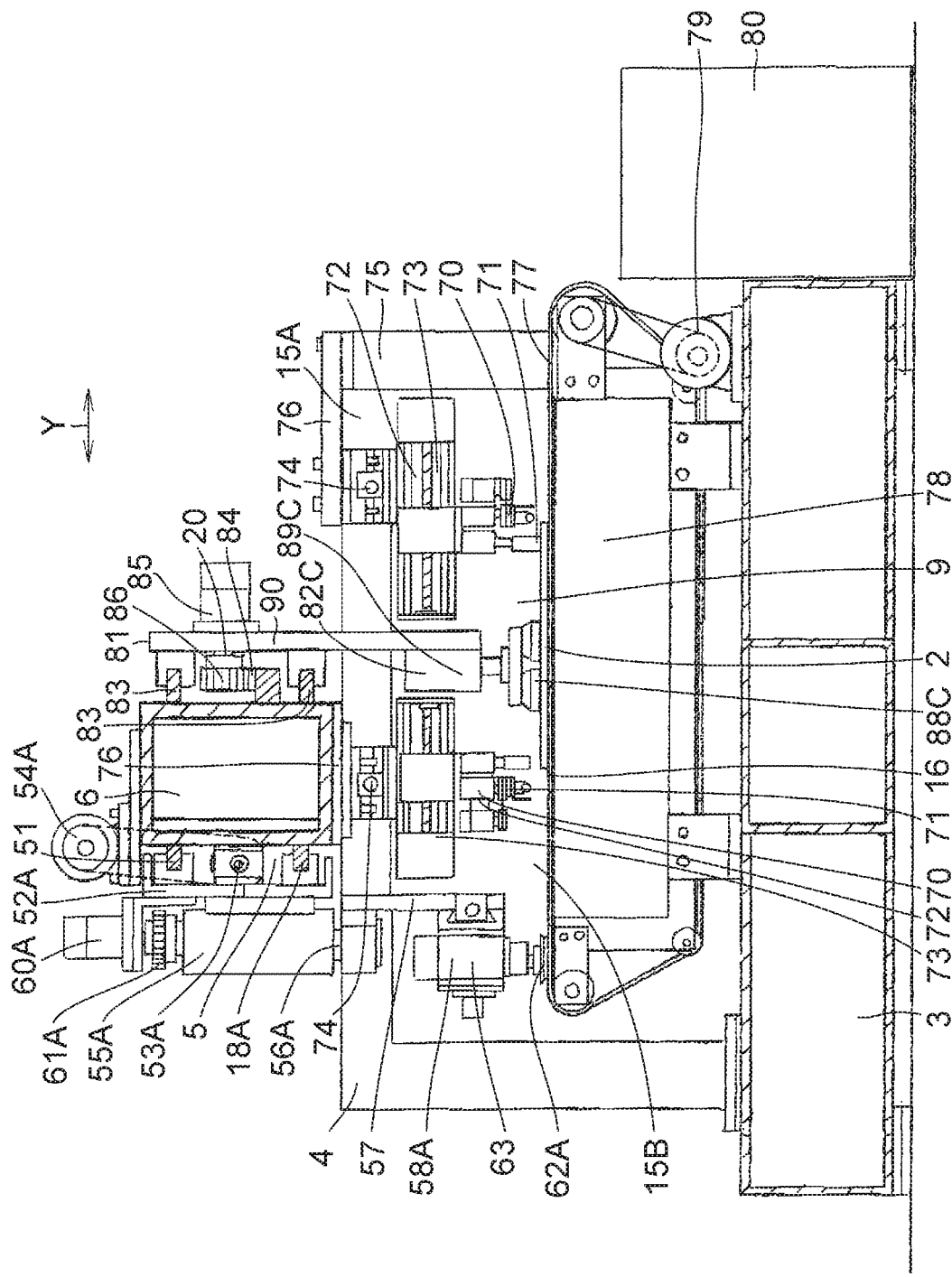
FIG. 5 is a cross-sectional view taken in the direction of arrows along line V-V of FIG. 1.

In FIGS. 1 to 6, a glass-plate working apparatus 1 includes a base 3 which is installed on a floor surface F; a pair of portal frame columns 4 erected uprightly on the base 3 in such a manner as to be spaced apart from each other in a direction X which is an X-axis direction; a linear mount 6 provided in such a manner as to bridge the frame columns 4 in the direction X; a feeding position 7, a scribing position 8, a bend-breaking position 9, a grinding position 10, and a discharging position 11 which are arranged in series on the base 3 in the direction X; and a glass-plate transporting device 20 disposed in such a manner as to extend straightly in the direction X above the respective positions 7, 8, 9, 10, and 11.

In the feeding position 7, a feeding table 12 is provided which is constituted by a belt conveyor device and on which two glass plates 2, which are unshaped glass plates fed and split into smaller pieces, are positioned and placed with an interval therebetween in series in a transporting direction A parallel to the direction X. In the scribing position 8, a scribe line forming device 5 is provided which has a scribe worktable 13 which is moved in a direction Y, i.e., a Y-axis direction perpendicular to the X-axis direction, and supports in series in the direction X the two glass plates 2 carried in from the feeding position 7, as well as two scribe heads 14A and 14B which integrally move in the direction X. In the bend-breaking position 9, there are provided a belt conveyor device 16 for planarly (horizontally) supporting in series in the direction X the two glass plates 2 having the scribe lines formed thereon and carried in from the scribing position 8, as well as two pairs of glass-plate bend-breaking devices 15A and 15B for effecting the end cutting and bend-breaking separation of the two glass plates 2 placed on the belt conveyor device 16. Two glass plate peripheral edge grinding devices 19A and 19B are provided in the grinding position 10, and a discharging belt conveyor device 49 is provided in the discharging position 11.

The scribe worktable 13 has a table body 22 for planarly supporting the two glass plates 2 in series in the direction X and at an interval therebetween after receiving on its upper surface the two glass plates 2 carried in from the feeding table 12, as well as a table supporting base 23 for fixing and supporting the table body 22 on the upper surface of which the two glass plates 2 are placed. The scribe line forming device 5 further includes a Y-axis moving means 24 with the table supporting base 23 disposed thereon, an X-axis moving base 38 with the scribe heads 14A and 14B mounted thereon and an X-axis moving means 36 with the X-axis moving base 38 disposed thereon.

The Y-axis moving means 24 includes two guide rails 25 juxtaposed on an upper surface of the base 3 along the Y-axis direction; slide blocks 26 which are held movably on the two guide rails 25 in the direction Y and on upper surfaces of which the table supporting base 23 is fixed; a feed screw 27 which is threadedly engaged with a nut mounted on the table supporting base 23 and provided between the two guide rails 25; and a Y-axis control motor 28 coupled to one end of the feed screw 27 and adapted to move the table supporting base 23 in the direction Y by rotating the feed screw 27 by NC operation, hence moving the table body 22 in the direction Y, i.e., effecting the Y-axis movement thereof.

The tow scribe heads 14A and 14B, which are provided on a front surface 69 of the mount 6 through the X-axis moving means 36 used in common for the scribe heads 14A and 14B and move in the direction X, i.e., undergo X-axis movement, in correspondence with the table body 22 which undergoes Y-axis movement, are provided in correspondence with the respective positions of the two glass plates 2 placed on the table body 22.

The X-axis moving means 36 includes two guide rails 37 juxtaposed on the mount 6 in the range of the X-axis movement corresponding to the scribe worktable 13; the X-axis moving base 38 fixed to slide blocks held on these guide rails 37 movably in the direction X; a feed screw 39 which is threadedly engaged with a nut mounted on the X-axis moving base 38 and provided in between the two guide rails 37; and an X-axis control motor 40 coupled to one end of the feed screw 39 through a pulley and a belt and adapted to move the X-axis moving base 38 in the direction X by rotating the feed screw 39 by NC operation, hence moving the scribe heads 14A and 14B in the direction X, i.e., effecting the X-axis movement thereof.

The scribe head 14A is mounted on the X-axis moving base 38 through a bearing unit 41A. The bearing unit 41A has a rotating shaft 42A held by a bearing (not shown), and the rotating shaft 42A has an axis perpendicular to an X-Y coordinate plane, i.e., to the upper surface of the glass plate 2. A scribe head body 44A is mounted at a lower end portion of the rotating shaft 42A by means of a bracket, and an angle control motor 45A is coupled to an upper end portion thereof via a spur gear.

In the same way as the scribe head 14A, the scribe head 14B is mounted on the X-axis moving base 38 through a bearing unit 41B. The bearing unit 41B has a rotating shaft 42B held by a bearing (not shown), and the rotating shaft 42B has an axis perpendicular to an X-Y coordinate plane, i.e., to the upper surface of the glass plate 2. A scribe head body 44B is mounted at a lower end portion of the rotating shaft 42B by means of a bracket, and an angle control motor 45B is coupled to an upper end portion thereof via a spur gear.

The scribe head body 44A includes a cutter head 47A having a cutter wheel 46A at a lower end thereof and an air cylinder unit 48A which is mounted on an upper portion of the cutter head 47A, vertically moves the cutter wheel 46A, and imparts cutting pressure to the cutter wheel 46A during scribing.

In the same way as the scribe head body 44A, the scribe head body 44B includes a cutter head 47B having a cutter wheel 46B at a lower end thereof and an air cylinder unit 48B which is mounted on an upper portion of the cutter head 47B, vertically moves the cutter wheel 46B, and imparts cutting pressure to the cutter wheel 46B during scribing.

The cutter wheel 46A is disposed on the axis of the rotating shaft 42A and is subjected to angle rotation control about the axis perpendicular to the glass plate 2 by the angle control motor 45A through the rotating shaft 42A, thereby allowing its blade edge to be oriented in the scribing direction. Similarly, the cutter wheel 46B is disposed on the axis of the rotating shaft 42B, and is subjected to angle rotation control about the axis perpendicular to the glass plate 2 by the angle control motor 45B through the rotating shaft 42B, thereby allowing its blade edge to be oriented in the scribing direction.

The pair of glass-plate bend-breaking devices 15A are arranged with respect to the upstream-side glass plate 2 in the transporting direction A above the belt conveyor device 16, while the pair of bend-breaking devices 15B are similarly arranged with respect to the downstream-side glass plate 2 in the transporting direction A above the belt conveyor device 16.

Each of the pair of glass-plate bend-breaking devices 15A and each of the pair of glass-plate bend-breaking devices 15B respectively have an end cutter unit 70, a press unit 71, and a moving means 72 for holding the end cutter unit 70 and the press unit 71 and for moving them along the upper surface of the glass plate 2. The moving means 72 has a Y-axis moving device 73 for holding the end cutter unit 70 and the press unit 71 and moving them in the Y-axis direction under NC control, as well as an X-axis moving device 74 for holding the Y-axis moving device 73 and moving them in the X-axis direction, and is mounted, at the X-axis moving device 74, on the mount 6 and on an upright body 75, erected on the base 3, by means of a bracket 76.

The belt conveyor device 16 has an endless conveyor belt 77 wound around four rollers so as to be circulatable, a supporting plate/frame 78 for planarly supporting from the inner side the conveyor belt 77 positioned above and for rotatably supporting the four pulleys, and a drive unit 79 for circulating the conveyor belt 77 and having an electric motor supported on the base 3. The supporting plate/frame 78 is supported on the base 3, and as the electric motor is operated, the drive unit 79 rotates one of the four rollers which is coupled to an output rotating shaft of the electric motor via such as a pulley and a belt, which rotation is adapted to run the conveyor belt 77. As the conveyor belt 77 is run, end cut cullets of the glass plates 2 bend-broken by the glass-plate bend-breaking devices 15A and 15B and remaining on the conveyor belt 77 are transported to a cullet accommodating container 80.

In the two glass-plate peripheral edge grinding devices 19A and 19B which are numerically controlled mutually independently, the glass-plate peripheral edge grinding device 19A has a grinding worktable 17A which sucks and supports the glass plate 2 and is moved along the Y-axis in the direction Y, a Y-axis moving means 31A for moving the grinding worktable 17A along the Y-axis, a grinding head 18A which is moved along the X-axis in the direction X, and an X-axis moving means 50A for moving the grinding head 18A along the X-axis. The glass-plate peripheral edge grinding device 19B has a grinding worktable 17B which sucks and supports the glass plate 2 and is moved along the Y-axis in the direction Y, a Y-axis moving means 31B for moving the grinding worktable 17B along the Y-axis, a grinding head 18B which is moved along the X-axis in the direction X, and an X-axis moving means 50B for moving the grinding head 18B along the X-axis.

The grinding worktable 17A and the grinding worktable 17B are adapted to be moved along the Y-axis mutually independently by the Y-axis moving means 31A and 31B without using one Y-axis moving means in common. Also, the grinding head 18A and the grinding head 18B are adapted to be moved along the X-axis mutually independently by the X-axis moving means 50A and 50B without using one X-axis moving means in common. An interval in the direction X between the glass-plate peripheral edge grinding device 19A and the glass-plate peripheral edge grinding device 19B, i.e., an interval in the direction X between the grinding worktable 17A and the grinding worktable 17B, is identical to an interval in the direction X between the two serial glass plates 2 which are transported by the glass-plate transporting device 20.

The grinding worktable 17A has a plurality of suction pads 29A for sucking the glass plate 2 on the upper surface thereof as well as a table base 30A on which the plurality of suction pads 29A are detachably mounted. The grinding worktable 17B has a plurality of suction pads 29B for sucking the glass plate 2 on the upper surface thereof as well as a table base 30B on which the plurality of suction pads 29B are detachably mounted. The grinding worktable 17A is mounted at the table base 30A thereof on the Y-axis moving means 31A, and the grinding worktable 17B is mounted at the table base 30B thereof on the Y-axis moving means 31B. The Y-axis moving means 31A and the Y-axis moving means 31B are juxtaposed on the upper surface of the base 3 with the aforementioned interval therebetween in the direction X, and are adapted to be numerically controlled independently of each other so as to move the grinding worktable 17A and the grinding worktable 17B along the Y-axis independently of each other.

The Y-axis moving means 31A includes two guide rails 32A juxtaposed on the upper surface of the base 3 along the Y-axis direction; slide blocks 33A respectively held by the guide rails 32A movably in the direction Y; a feed screw 34A which is threadedly engaged with a nut fixed to the table base 30A and provided in between the guide rails 32A; and a Y-axis control motor 35A coupled to one end of the feed screw 34A. The grinding worktable 17A is adapted to be moved along the Y-axis as the Y-axis control motor 35A is driven.

The Y-axis moving means 31B includes two guide rails 32B juxtaposed on the upper surface of the base 3 along the Y-axis direction; slide blocks 33B respectively held by the guide rails 32B movably in the direction Y; a feed screw 34B which is threadedly engaged with a nut fixed to the table base 30B and provided in between the guide rails 32B; and a Y-axis control motor 35B coupled to one end of the feed screw 34B. The grinding worktable 17B is adapted to be moved along the Y-axis as the Y-axis control motor 35B is driven.

In the two grinding heads 18A and 18B which are provided on the front surface 69 of the mount 6 in correspondence with the respective grinding worktables 17A and 17B to undergo X-axis movement, the grinding head 18A undergoes X-axis movement in correspondence with the grinding worktable 17A, while the grinding head 18B undergoes X-axis movement in correspondence with the grinding worktable 17B.

The grinding head 18A is provided on the mount 6 via the X-axis moving means 50A, and the grinding head 18B is provided on them mount 6 via the X-axis moving means 50B.

The X-axis moving means 50A on which the grinding head 18A is mounted includes two guide rails 51A juxtaposed on the mount 6 in an X-axis movement range corresponding to the grinding worktable 17A; an X-axis moving base 52A on which slide blocks held by the guide rails 51A movably in the direction X are fixed; a feed screw 53A which is threadedly engaged with a nut fixed to the X-axis moving base 52A and is provided in between the guide rails 51A; and an X-axis control motor 54A coupled to one end of the feed screw 53A. As the X-axis control motor 54A is driven, the X-axis moving base 52A and, hence, the grinding head 18A are adapted to be moved along the X-axis in correspondence with the grinding worktable 17A, and the grinding head 18A is mounted on the X-axis moving base 52A through a bearing unit 55A.

The bearing unit 55A has a rotating shaft 56A which is held by a bearing (not shown) and has an axis perpendicular to an X-Y plane, i.e., the upper surface of the glass plate 2. A grinding head body 58A is mounted on a lower end portion of the rotating shaft 56A via a bracket 57A, while an angle control motor 60A is coupled to an upper end portion thereof via a spur gear 61A.

The grinding head body 58A has a spindle motor 63A having an output rotating shaft with a grinding wheel 62A mounted thereon, as well as a slide unit 64A for adjusting in the directions X and Y the position of the spindle motor 63A and, hence, the position of the grinding operation portion of the grinding wheel 62A.

The grinding operation portion of the grinding wheel 62A is positioned on the axis of the rotating shaft 56A by the slide unit 64A, and the grinding wheel 62A is oscillated about the grinding operation portion while controlling the rotational angle of the rotating shaft 56A by the operation of the angle control motor 60A, whereby the grinding wheel 62A is adapted to perform the grinding of peripheral edges of the glass plate 2 constantly at a fixed angle with respect to the changing configuration of the peripheral edges of the glass plate 2.

The X-axis moving means 50B on which the grinding head 18B is mounted includes two guide rails 51B juxtaposed on the mount 6 in an X-axis movement range corresponding to the grinding worktable 17B; an X-axis moving base 52B on which slide blocks held by the guide rails 51B movably in the direction X are fixed; a feed screw 53B which is threadedly engaged with a nut fixed to the X-axis moving base 52B and is provided in between the guide rails 51B; and an X-axis control motor 54B coupled to one end of the feed screw 53B. As the X-axis control motor 54B is driven, the X-axis moving base 52B and, hence, the grinding head 18B are adapted to be moved along the X-axis in correspondence with the grinding worktable 17B, and the grinding head 18B is mounted on the X-axis moving base 52B through a bearing unit 55B.

The bearing unit 55B has a rotating shaft 56B which is held by a bearing (not shown) and has an axis perpendicular to an X-Y plane, i.e., the upper surface of the glass plate 2. A grinding head body 58B is mounted on a lower end portion of the rotating shaft 56B via a bracket 57B, while an angle control motor 60B is coupled to an upper end portion thereof via a spur gear 61B.

The grinding head body 58B has a spindle motor 63B having an output rotating shaft with a grinding wheel 62B mounted thereon, as well as a slide unit 64B for adjusting in the directions X and Y the position of the spindle motor 63B and, hence, the position of the grinding operation portion of the grinding wheel 62B.

The grinding operation portion of the grinding wheel 62B is positioned on the axis of the rotating shaft 56B by the slide unit 64B, and the grinding wheel 62B is oscillated about the grinding operation portion while controlling the rotational angle of the rotating shaft 56B by the operation of the angle control motor 60B, whereby the grinding wheel 62B is adapted to perform the grinding of peripheral edges of the glass plate 2 constantly at a fixed angle with respect to the changing configuration of the peripheral edges of the glass plate 2.

The feeding table 12, the scribe worktable 13, the belt conveyor device 16, and the grinding worktables 17A and 17B, which are arranged in series below the mount 6 with intervals therebetween along the mount 6, i.e., along the direction X, as well as the glass-plate transporting device 20 which is provided on a rear surface 21 side of the mount 6 along the mount 6, i.e., along the direction X, in such a manner as to extend above the discharging belt conveyor device 49, are adapted to linearly transport two glass plates 2 at a time in parallel in the direction X while replacing them serially in the transporting direction A in the respective working positions 8, 9, and 10.

The glass-plate transporting device 20 has a transporting shuttle 81 which linearly reciprocates along the direction X and pairs of glass-plate sucking as well as lifting devices 82A, 82B, 82C, and 82D which are provided on a bracket 90 along the direction X and in series in the direction X in units of two devices at positions corresponding to the feeding table 12, the scribe worktable 13, the belt conveyor device 16, and the grinding worktables 17A and 17B. Two traveling motors 85 are driven under synchronous numerical control and are adapted to cause the bracket 90 and the glass-plate sucking and lifting devices 82A, 82B, 82C, and 82D to integrally effect numerically controlled reciprocating motion.

The transporting shuttle 81, which is provided in such a manner as to extend above the feeding table 12, the scribe worktable 13, and the belt conveyor device 16 and above the grinding worktables 17A and 17B, is held movably in the direction X via slide blocks by two guide rails 83 juxtaposed on the rear surface 21 of the mount 6 in such a manner as to range from above the feeding table 12 to above the discharging belt conveyor device 49, and is adapted to linearly move in parallel in the direction X while being guided by the guide rails 83.

On the rear surface 21 of the mount 6, a rack 84 is juxtaposed between the guide rails 83 in parallel thereto. The transporting shuttle 81 has the bracket 90 which is secured to the slide blocks supported on the guide rails 83 movably in the direction X and is set in an upright position, as well as the two traveling motors 85 mounted on the bracket 90. A pinion gear 86 meshing with the rack 84 is mounted on an output shaft of each of the two traveling motors 85.

The pairs of glass-plate sucking and lifting devices 82A, 82B, 82C, and 82D respectively have pluralities of suction pads 88A, 88B, 88C, and 88D for effecting the sucking of, and the releasing of suction of, the glass plate 2 and lifting units 89A, 89B, 89C, and 89D to which corresponding ones of the suction pads 88A, 88B, 88C, and 88D are attached and which respectively raise or lower the suction pads 88A, 88B, 88C, and 88D. The glass-plate sucking and lifting devices 82A, 82B, 82C, and 82D are mounted, respectively at the lifting units 89A, 82B, 82C, and 82D thereof, on the bracket 90 and, hence, on the transporting shuttle 81 in a vertically extending posture.

The glass-plate transporting device 20 causes the glass-plate sucking and lifting devices 82A, 82B, 82C, and 82D to reciprocate between adjacent positions of the feeding position 7, the scribing position 8, the bend-breaking position 9, the grinding position 10, and the discharging position 11 by the reciprocating linear motion of the transporting shuttle 81 in the direction X. For example, in the feeding position 7, the two suction pads 88A are lowered by the lifting units 89A, and the two glass plates 2 on the feeding table 12 are sucked by the suction pads 88A. After the suction, the glass plates 2 are raised by the lifting units 89A through the suction pads 88A, and, after the raising, the glass-plate sucking and lifting devices 82A are moved forward to the scribing position 8 in the direction X by the forward movement in the direction X of the transporting shuttle 81 as the traveling motor 85 is operated. In this scribing position 8, the lifting units 89A are operated to lower the two suction pads 88A, and as the suction of the suction pads 88A is released, the two glass plates 2 are delivered onto the table body 22, whereupon the two empty suction pads 88A are raised by the lifting units 89A, and the two empty suction pads 88A are moved backward to the feeding position 7 in the direction X by the backward movement in the direction X of the transporting shuttle 81 to set the returned suction pads 88A on standby in the feeding position 7. Thus, through the operation of the transporting shuttle 81, the pairs of glass-plate sucking and lifting devices 82A, 82B, 82C, and 82D, and the suction pads 88A, 88B, 88C, and 88D, the glass-plate transporting device 20 is adapted to transport the two glass plates 2, i.e., unshaped glass plates, on the feeding table 12 onto the scribe worktable 13, transport the two glass plates 2 with cut lines formed thereon on the scribe worktable 13 onto the belt conveyor device 16 in the bend-breaking position 9, transport the two glass plates 2 bend-broken in the bend-breaking position 9 onto the pluralities of suction pads 29A and 29B at the grinding worktables 17A and 17B, and transport the two ground glass plates 2 on the pluralities of suction pads 29A and 29B at the grinding worktables 17A and 17B onto the discharging conveyor device 49.

In the above-described glass-plate working apparatus 1, there are provided the scribing position 8 for forming scribe lines on two glass plates 2, the bend-breaking position 9 for bend-breaking the two glass plates 2, the grinding position 10 for grinding peripheral edges of the corresponding glass plates 2 by the two glass-plate peripheral edge grinding devices 19A and 19B which are moved under control by the X-Y coordinate system, and the glass-plate transporting device 20 whereby two glass plates 2 at a time are replaced and transported consecutively among these positions, wherein the X-Y coordinate system controlled movement of the two glass-plate peripheral edge grinding devices 19A and 19B is adapted to be effected independently of each other. In this glass-plate working apparatus 1, at its operation start, the two suction pads 88A of the glass-plate sucking and lifting devices 82A are lowered at the feeding table 12 to suck and raise the two unshaped glass plates 2 on the feeding table 12. After this suction and raising, the transporting shuttle 81 is moved forward, and when the two suction pads 88A with the two glass plates 2 sucked thereby reach above the scribe worktable 13, the suction pads 88A are respectively lowered to release suction and place the two glass plates 2 on the scribe worktable 13. The emptied suction pads 88A are respectively raised and are returned again to above the feeding table 12 by the backward movement of the transporting shuttle 81. In conjunction with this return, at the same time as both suction pads 88B are returned onto the scribe worktable 13, the scribe heads 14A and 14B and the scribe worktable 13 are moved in the directions X and Y, i.e., moved by the X-Y coordinate system, to thereby form scribe lines on the two glass plates 2. Upon completion of the forming of the scribe lines, the scribe worktable 13 is returned to a point of origin thereof, whereupon the suction pads 88B are lowered, and the two glass plates 2 with the scribe lines formed thereon are sucked and lifted by the suction pads 88B. The two glass plates 2 with the scribe lines formed thereon are transported toward the bend-breaking position 9 by means of moving forward of the transporting shuttle 81, and when the two glass plates 2 with the scribe lines formed thereon reach the bend-breaking position 9, the suction pads 88B are lowered and releases suction. When the two glass plates 2 with the scribe lines formed thereon are placed on the conveyor belt 77, both suction pads 88B are returned to above the scribe worktable 13 by the backward movement of the transporting shuttle 81. In turn, the two suction pads 88C corresponding to the bend-breaking position 9 are returned to the bend-breaking position 9, and both suction pads 88C are immediately lowered. The suction pads 88C suck the two glass plates 2 with the scribe lines formed thereon and placed on the conveyor belt 77 and press the glass plates 2 onto the conveyor belt 77 so that the glass plates 2 do not move. In this state, the glass-plate bend-breaking devices 15A and 15B are operated to integrally move an end cutter unit 70A and a press unit 71A as well as an end cutter unit 70B and a press unit 71B respectively above the corresponding glass plates 2 with the scribe lines formed thereon, wherein, first, end cut lines are formed at required positions of the glass plates 2 by the end cutter units 70A and 70B in an initial step, and the glass plates 2 are pressed at required positions thereof by the press units 71A and 71B to bend-break and separate unwanted portions (end cut cullets) in their outer regions along the scribe lines, thereby forming two cutout glass plates 2, i.e., two end cut glass plates 2.

The both suction pads 88C which are continuing to suck the two end cut glass plates 2 are raised as they are and are set on standby in the state of lifting the glass plates 2. In this standby, the unwanted portions in the outer regions, i.e., so-called end cut cullets, are transported from the conveyor belt 77 to the cullet accommodating container 80 by the operation of the drive unit 79. After this transport, the traveling of the conveyor belt 77 is stopped, while the transporting shuttle 81 starts to move forward in the direction X upon the completion of the grinding in the grinding position 10. When the two suction pads 88C in the state of lifting the glass plates 2 respectively reach above the corresponding grinding worktables 17A and 17B, the suction pads 88C are lowered, and the glass plates 2 are respectively released from suction and placed on the suction pads 29A and 29B on the grinding worktables 17A and 17B. In this placement, the respective suction pads 29A and 29B on the grinding worktables 17A and 17B suck and horizontally fix the glass plates 2, and the suction pads 88C which were moved to the grinding area and emptied are respectively raised and are returned to above the conveyor belt 16 by the backward movement of the transporting shuttle 81, while the suction pads 88D are also returned to above the grinding worktables 17A and 17B. Then, the two glass-plate peripheral edge grinding devices 19A and 19B commence the movement of the grinding worktables 17A and 17B and the grinding heads 18A and 18B in the X-Y coordinate system under mutually independent numerical control, as well as grinding operation of the grinding wheels 62A and 62B through oscillatory rotation (angle rotation) thereof, thus subjecting the two glass-plate peripheral edge grinding devices 19A and 19B to numerical control in correspondence with the positions of the glass plates 2 placed on the respective grinding worktables 17A and 17B. Namely, the Y-axis movement of the respective grinding worktables 17A and 17B, the X-axis movement of the respective grinding heads 18A and 18B, and swivel angle (oscillatory swiveling) of the respective grinding wheels 62A and 62B are numerically controlled in correspondence with the respective positions of the glass plates 2, to thereby perform grinding with respect to the glass plates 2 sucked and fixed by the suction pads 29A and 29B.

Upon completion of the grinding by both glass-plate peripheral edge grinding devices 19A and 19B, both grinding worktables 17A and 17B are returned to their points of origin, and the suction pads 88D positioned in the grinding position 10 are respectively lowered to the corresponding grinding worktables 17A and 17B to suck and raise the respective ground glass plates 2, and are transported toward the discharging belt conveyor 49 by the forward movement of the transporting shuttle 81. Upon reaching above the discharging belt conveyor device 49, the suction pads 88D are lowered and release suction to carry out the two glass plates 2 onto the discharging belt conveyor device 49. The emptied suction pads 88D are respectively returned to above the corresponding grinding worktables 17A and 17B in the grinding position 10.

The glass-plate working apparatus 1 is comprised of the scribe line forming device 5 for forming scribe lines on two glass plates 2; the glass-plate bend-breaking devices 15A and 15B for bend-breaking the two glass plates 2; the glass-plate peripheral edge grinding devices 19A and 19B for grinding peripheral edges of the two glass plates 2; and the glass-plate transporting device 20 for carrying in and carrying out two glass plates at a time with respect to each of the scribe line forming device 5, the glass-plate bend-breaking devices 15A and 15B, and the glass-plate peripheral edge grinding devices 19A and 19B, wherein X-Y coordinate system controlled movement of the glass-plate peripheral edge grinding devices 19A and 19B in the simultaneous grinding of peripheral edges of the two glass plates 2 is adapted to be effected independently of each other. In this glass-plate working apparatus 1, after the operation start, the above-described operation is performed continuously and repeatedly with respect to each two glass plates 2 which are consecutively fed to the feeding table 12, and the ground glass plates 2 are consecutively carried out two glass plates 2 at a time onto the discharging belt conveyor device 49.

DESCRIPTION OF REFERENCE NUMERALS

1: glass-plate working apparatus
2: glass plate
3: base

The invention claimed is:

1. A glass-plate working apparatus comprising:
a scribe line forming device for forming scribe lines on two glass plates;
a glass-plate bend-breaking device for bend-breaking the two glass plates;
a glass-plate peripheral edge grinding device for grinding peripheral edges of the two glass plates; and
a glass-plate transporting device for carrying in and carrying out two glass plates at a time with respect to each of the scribe line forming device, the glass-plate bend-breaking device, and the glass-plate peripheral edge grinding device,
the glass-plate peripheral edge grinding device having a grinding worktable which sucks and supports the glass plate and is moved along a Y-axis, a Y-axis moving means for moving the grinding worktable along the Y-axis, a grinding head which is moved along an X-axis, and an X-axis moving means for moving the grinding head along the X-axis,
X-Y coordinate system controlled movement of the glass-plate peripheral edge grinding device in simultaneous grinding of peripheral edges of the two glass plates being adapted to be effected independently of each other.

2. A glass-plate working apparatus comprising:
a scribing position for forming scribe lines on two glass plates;
a bend-breaking position for bend-breaking the two glass plates;
a peripheral edge grinding position for grinding peripheral edges of corresponding ones of the glass plates by two glass-plate peripheral edge grinding devices which are moved under control by a X-Y coordinate system, and
a glass-plate transporting device whereby two glass plates at a time are replaced and transported consecutively among said positions,
each of said two glass-plate peripheral edge grinding devices having a grinding worktable which sucks and supports the glass plate and is moved along a Y-axis, and a grinding head which is moved along an X-axis,
X-Y coordinate system controlled movement of the two glass-plate peripheral edge grinding devices being adapted to be effected independently of each other.

* * * * *